Dec. 31, 1968  P. M. ERLANDSON  3,418,835
FLUID LUBRICATED ELECTROHYDRAULIC BODY SEPARATING AND FORMING
Filed April 26, 1966  Sheet 1 of 2

INVENTOR
PAUL M. ERLANDSON
BY Mason, Porter, Diller & Brown
ATTORNEYS

Dec. 31, 1968  P. M. ERLANDSON  3,418,835
FLUID LUBRICATED ELECTROHYDRAULIC BODY SEPARATING AND FORMING
Filed April 26, 1966  Sheet 2 of 2

INVENTOR
PAUL M. ERLANDSON
BY
Mason, Porter, Willer & Brown
ATTORNEYS 3,418,835
FLUID LUBRICATED ELECTROHYDRAULIC BODY SEPARATING AND FORMING
Paul M. Erlandson, Palos Park, Ill., assignor to Continental Can Company, Inc., New York, N.Y.
Filed Apr. 26, 1966, Ser. No. 545,286
26 Claims. (Cl. 72—56)

ABSTRACT OF THE DISCLOSURE

Electrohydraulic methods and apparatus for forming or severing tubular work pieces are disclosed herein. A pair of concave reflectors are mounted by a horn along which the tubular work piece travels. The reflectors are arranged face-to-face and define a peripheral opening therebetween and first and second electrodes extend through the reflectors for the production of an electrical discharge therebetween. Forces resultant from an electrical discharge between the electrodes are radiated outwardly therefrom via a fluid contained in the cavity between the reflectors and these forces are directed against the tubular work piece through the peripheral opening defined by the reflectors.

---

This invention relates to methods and apparatus for performing operations on a tubular member and more specifically to an electrohydraulic chamber formed in a horn structure positioned within the tubular member which when supplied suitable electrical energy, will produce an electrical discharge within the chamber to force the tubular member outwardly so as to be severed, flanged, embossed, reformed, etc. according to the dictates of a surrounding die. The tubular member is not halted or retarded in its velocity during operation but continues at a high speed.

The present invention is well adapted for use in the formation of container bodies, the container bodies being usually of metal although oftentimes of plastic, paper, etc. Although the invention has equal applicability to the formation of container bodies of plastic, paper, etc., the description will be directed to the formation of metal container bodies from a metal tubular member.

As the demand for containers increases, so must the ability of industry to supply these containers. Heretofore, in many container body forming operations, a blank of predetermined dimensions was formed about a horn and a seam was fabricated to join the opposing edges of the blank. Thereafter, the seam was sealed such as by soldering and a container end was rolled into place. The container was thus made ready for filling and sealing.

Subsequently, it was discovered that certain economies may be effected by the formation of a tube from a strip of material and, after joining and sealing the opposing edges of the newly formed tube, the tube could be severed and flanged into desired lengths. Thereafter, the container body so formed could be embossed, printed, reformed, etc., as found desirable. It is clear that the formation of container bodies from a continuous legnth of tubular material introduced a number of problems. One of the problems relates to the deformation of the container body during its severing or separation from the tubular member. In addition, if the invention is to be truly successful, the tubular member must be propelled at high velocities which dictate that the container body must be severed from the tubular member "on the fly" since the accelerating and decelerating or stopping and starting of the tubular member introduced great inefficiencies. Further, it is intuitively evident that the mechanism must have a long and useful service life to avoid costly down time for repair and adjustment. The present invention overcomes many disadvantages of previous attempts in this field by providing a chamber having at least one pair of electrodes protruding therein and, when suitable electrical energy is supplied to the electrodes, the forces created cause the tubular member to engage a split die to result in a formation of the tubular member and/or container body according to the dictates of the die.

Accordingly, it is the principal object of the present invention to improve apparatus and methods for severing, flanging, embossing, reforming, etc. tubular members.

It is another object of the present invention to increase the efficiency and speed at which a tubular member may be severed, flanged, embossed, reformed, etc., incident to the formation of container bodies.

It is a further object of the present invention to provide an electrohydraulic tube forming apparatus which is adapted to be operative at high tube velocities and which minimizes tube deformations during operation.

It is a still further object of the present invention to provide a horn adapted to support an electrohydraulic discharge whose force is directed outwardly toward a tubular member to direct the tubular member into a die which results in an operation on the member.

These and other objects of the present invention are accomplished by providing a structure which is positioned within a die, sufficient space being allowed between the periphery of the structure and the inner surface of the die to accommodate a tubular member. The die may be a split die which is transported by a conventional die conveyor or by means disclosed in the copending patent applications of John W. Grek, Ser. No. 400,044, filed Sept. 29, 1964, and John T. Cary, Ser. No. 342,603, filed Feb. 5, 1964. The tubular member is usually transported at a velocity equal to the velocity of the movable die. The internal structure may be referred to as a horn and this structure includes a first electrode reflector having a concave surface and a second electrode reflector having a concave surface, the concave surfaces being so positioned as to be in opposing relationship so that a cavity is formed between the first and second electrode reflectors. An electrode is positioned through each of the electrode reflectors and extends into the chamber whereby the application of suitable electric power will cause a discharge to occur between the electrodes. The electrode reflectors are slightly separated so that a peripheral exposure is formed for transmitting energy from the electrical discharge to the inner circumference of the tubular member. The duration of the electrical energy applied across the electrodes may be chosen within limits by choice of the electrode gap characteristics, the voltage, capacitors storage in the power supply, etc. It is most efficient if the energy of the electrical pulse generated in the liquid is matched with the cavity in a manner to provide a uniform force generally directed outwardly toward the peripheral exposure. The discharge of a high power spark across the gap between the electrodes produces a plasma bubble which is formed in the spark gap and continues to grow as continued power flows into the spark gap from the power supply. This displacement of the fluid by the bubble forces the tubular member outwardly very rapidly against the die, the operation performed depending upon the configuration of the die whether it be severing, flanging, embossing, reforming, etc. Precise amounts of power can be supplied to the spark gap by the power supply and sufficient electrical storage may be available so that a plurality of discharges may be caused to occur in rapid succession if such is found desirable. More than one pair of electrodes, each pair having a separate power source, may be used.

Fluid may be supplied to the cavity or chamber through one of the electrodes and the tubular member may be caused to "float" over the device by the provision of an outer tube or jacket removed upstream from one of the electrode reflectors so as to form a cavity therebetween through which fluid may be pumped and introduced into the area between the periphery of the electrical discharge device and the inner circumference of the tubular member. Such fluid constitutes a "fluid bearing."

The invention both as to its organization and method of operation together with further objects and advantages thereof will best be understood by reference to the following specification taken in conjunction with the accompanying drawings in which.

Figure 1:
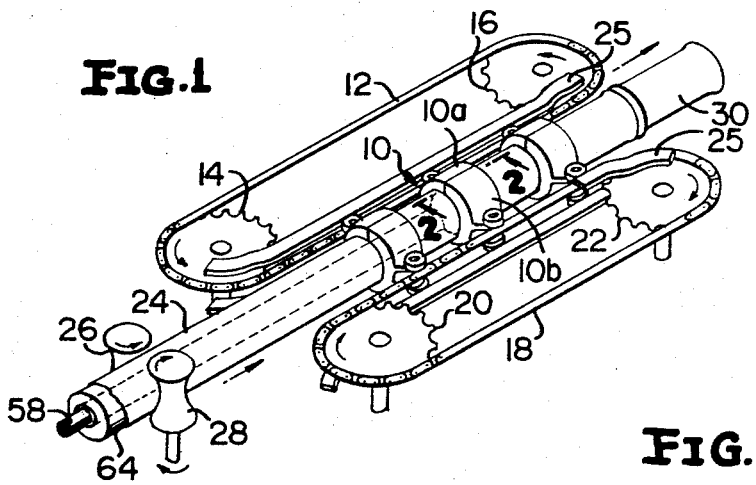
FIGURE 1 is a perspective view of a conveying device for advancing split dies employed in conjunction with the invention.

With reference to the FIGURE 1, the perspective view discloses a conveying device for split dies 10 each having a pair of die sections 10a and 10b. A die section 10a is connected to a chain member 12 which passes about a pair of sprockets 14 and 16. Similarly, a die section 10b is secured to a chain member 18 which chain member 18 passes about the sprockets 20 and 22. When a split die 10 is in the position shown, it is surrounding a tubular member 24 and through the cooperation of the chain members 12 and 18, is being advanced at a velocity commensurate with the velocity of the tubular member 24. A cam track 25 is provided for holding the split dies closed. The tubular member 24 may be advanced in any suitable manner such as by a pair of hourglass rolls 26 and 28, positioned in driving relationship on opposite sides of the tubular member 24 or by the towing device disclosed in a co-pending patent application of John W. Grek, Ser. No. 400,044, filed Sept. 29, 1964. When the die sections 10a and 10b reach the sprockets 16 and 22 respectively, the die sections 10a and 10b separate and reverse direction toward the sprockets 14 and 20 to there again engage the tubular member 24. At the point of separation of the die sections 10a and 10b, a container body 30 is visible which has been severed and flanged from the tubular member 24 through the cooperation of the electrohydraulic apparatus of later figures and a pair of die sections of another die 10. Thus a plurality of dies 10 must be provided, each die being separated from the next one by a distance equal to the height of a container body being severed. Subsequently, the container body 30 may be embossed, reformed, decorated, etc., by apparatus similar to be hereinafter described.

Figure 2:
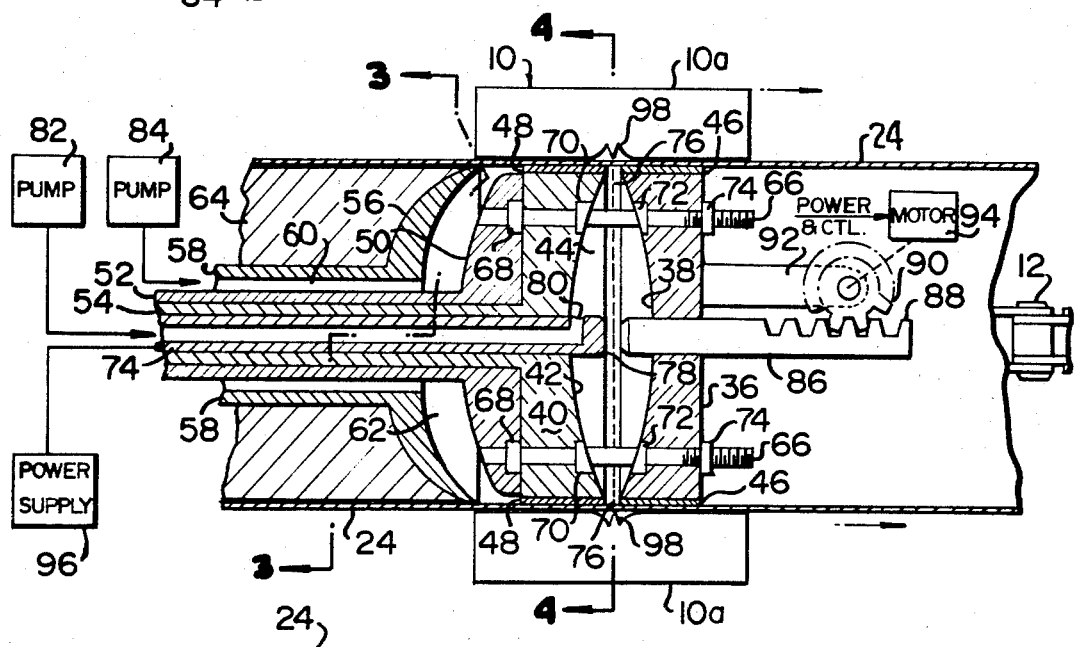
FIGURE 2 is a sectional view illustrating the cavity or chamber between the electrode reflectors, the electrodes projecting into the cavity, and the relationship of the electrohydraulic discharge device, the tubular member, and the die.

With reference to the FIGURE 2, a longitudinal sectional view of the apparatus is illustrated wherein the split die 10 having the die section 10a is shown surrounding the tubular member 24. The means for acting upon the tubular member 24 is shown concentric with the split die 10 and it will be readily understood that after the tubular member 24 has been severed by the split die 10, the split die 10 and the tubular member 24 will continue while the internal structure remains to again form the tubular member 24 at an upstream point when the sections of the next split die 10 are aligned with the internal structure.

More specifically, the electrohydraulic apparatus includes a first electrode reflector 36 having a concave surface 38 and a second electrode reflector 40 having a concave surface 42. The concave surfaces 38 and 42 are in opposing relationship so as to form a cavity or chamber 44 therebetween. Positioned about the periphery of the electrode reflector 36 is a ring 46 and about the electrode reflector 40 is a ring 48. The rings 46 and 48 may be of either a conducting or an insulating material; however, the material would be chosen so as to permit the proper fluid-dynamical design of the surface in proximity to the tubular member 24 and also possessing the property of minimizing friction between the tubular member 24 and the rings 46 and 48. For example, the rings 46 and 48 may be molded of a "slippery" plastic such as Teflon or alternatively, may have a chrome plated metallic surface which will allow the moving tubular member 24 to slip over its surface if the two should come into contact.

A support member 50 is positioned against the electrode reflector 40 and includes a longitudinally axially extending tube 52. In addition, the electrode reflector 40 includes a longitudinally extending tube 54 which is concentric with the tube 52. An outer jacket 56 includes a longitudinally and axially extending tube 58 which is concentric with the tubes 52 and 54 but spaced therefrom so that a passageway 60 is formed between the tubes 52 and 58. The support member 50 is in spatial relationship to the outer jacket 56 so as to form a chamber 62 therebetween. Additional supporting means are indicated at 64 which engages the outer jacket 56 and surrounds the tube 58, which may also be viewed in the FIGURE 1.

Figure 4:
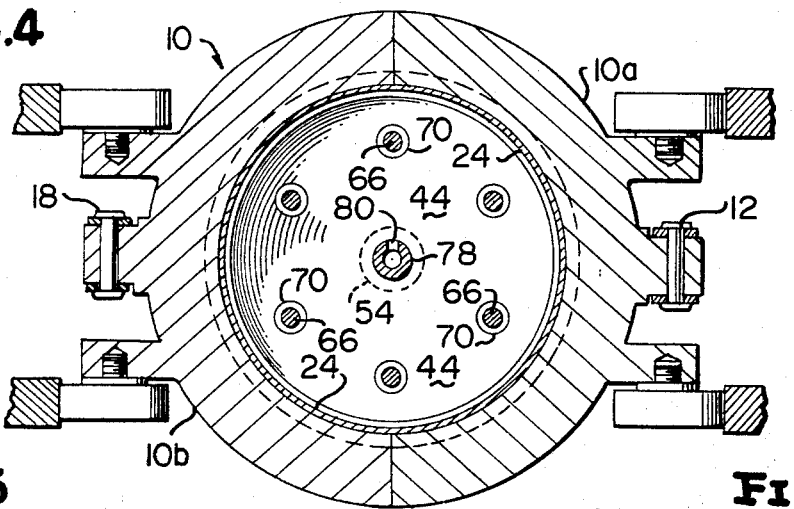
FIGURE 4 is a sectional view taken along the line 4—4 of the FIGURE 2 and illustrating the cavity and the cage of bolt members which retain the electrode reflectors in position and provide for an adjustment of the position.

As shown in the FIGURE 2 and perhaps best in the FIGURE 4, the position of the electrode reflector 36, the electrode reflector 40, and the support member 50 is maintained by a plurality of bolts 66 which is embedded in a locking device indicated at 68 in the support member 50. A securing device, such as a plurality of nuts 70, maintain the electrode reflector 40 against the flat surface of the support member 50 while a plurality of nuts 72 and 74 maintain the positional relationship of the electrode reflector 36. By rotating the nuts 72 and 74, the separation or peripheral exposure 76 of the electrode reflectors 36 and 40 may be adjusted. That is to say, by rotating the nuts 72 and 74, the peripheral exposure 76 may be increased or decreased as found desirable. Increasing the peripheral exposure 76 will increase the surface over which the electrical discharge acts while decreasing the peripheral exposure 76, will decrease the surface area of the tubular member 24 upon which the discharge is subjected.

With continued reference to the FIGURE 2, an electrode 78 is concentric with the tube 54 and extends into the cavity 44. The electrode 78 is hollow as indicated and discharges into the cavity 44 via an aperture 80. The horn structure located inside the tubular member 24 includes the support member 50 and its extending tube 52 which may also be the outer or grounded conductor of a rigid coaxial electrical transmission line. For example, the conductor might be a steel tube with copper or silver plate on its inner surface to provide good electrical conductivity. This grounded outer conductor (the support member 50 and its extending tube 52) is terminated by the electrode reflector 40 which is both electrically and mechanically secured, as previously indicated, to the support member 50. The center electrode 78 is electrically insulated from the support member 50 by any convenient means but a stream of fluid, such as water, may flow through its central passageway such that the entire cavity 44 contains a fluid under such pressure as may be desired. The fluid would be supplied to the cavity 44 via a pump 82 which communicates with the cavity 44 via the central passage in the electrode 78 and through the aperture 80. This pressure may be lower than the pressure supplied by a pump 84 to the chamber 62 between the support member 50 and the outer jacket 56 such that the net effect is to cause a flow of fluid between the electrode reflector 36 and the tubular member 24. This tends to minimize or eliminate a mechanical contact and provide a fluid bearing between the rings 46 and 48 and the inner circumference of the tubular member 24 to allow the tubular member to advance with a minimum of scratching and scraping of the peripheries of the rings 46 and 48.

The fluid passage is equivalent to a low-pass acoustical filter which allows steady state flow for fluid replacement, cooling and removal of contaminants, while preventing transmission of impulsive energy.

By providing a pump 84 that supplies a stream of fluid which can be fed against the inside surface of the advancing tubular member 24 prior to its encounter with the ring 48, a fluid cushion or bearing is achieved. The motion of the advancing tubular member 24 will serve to drag fluid into the area between the rings 46 and 48 and the tubular member 24. The fluid supplied by the pump 84 may be water, a lubricating medium, steam or another gas, such as an inert gas, or other suitable fluids.

In the FIGURE 2, an electrode 86 projects through the electrode reflector 36 and is aligned with the electrode 78 but spaced therefrom. The electrode 86 has a plurality of teeth 88 formed on its external end which are engaged by a gear 90, the gear 90 being supported from the electrode reflector 36 by a bracket 92. A motor 94 which is supplied power and controlling signals as indicated, is in driving relationship with the gear 90 so as to advance the electrode 86 as it may be consumed by the electrical discharges which take place between the tips of the electrodes 78 and 86 within the cavity 44. A power supply 96 is coupled to the electrode 78 which supplies the necessary electrical energy for producing the electrohydraulic discharge in the cavity 44. When it is desired to sever and flange the tubular member 24, electrical energy supplied by the power supply 96 is actuated. The force which performs the mechanical work of severing and flanging the tubular member 24 is created by the discharging of a high power spark across the spark gap between the electrodes 78 and 86. A plasma bubble is formed in the spark gap and continues to grow as continued power flows into the spark gap from the power supply 96. This displacement of the fluid in the cavity 44 by the bubble forces the fluid in the cavity 44 outwardly very rapidly against the tubular member 24 so that it is driven into a severing blade 98 formed about the inner circumference of the split die 10. Since the operation is extremely rapid, it is not necessary to halt the forward motion of the tubular member 24 during the severing and flanging operation. Precise amounts of power can be supplied to the spark gap by the power supply 96 and since the power supply 96 is sufficiently large so as to provide the necessary storage of electrical energy, a succession of discharges may be employed, such as may be necessary with embossing and reforming operations.

Figure 3:
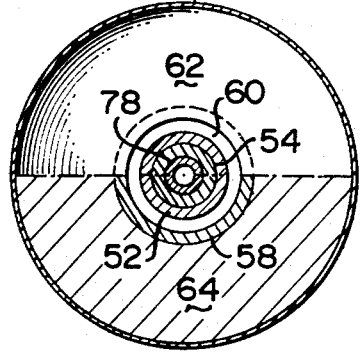
FIGURE 3 is a sectional view taken along the line 3—3 of the FIGURE 2.

The FIGURE 3 is a sectional view taken along the line 3—3 of the FIGURE 2 and illustrates the concentric nature of the tube 86 extending from the outer jacket 56, the extending tube 52 of the support member 50, the extending tube 54 from the electrode reflector 40 and the electrode 78. In addition, the chamber 62 to which is supplied the fluid for minimizing friction between the rings 46 and 48 and the inner circumference of the tubular member 24 is partially shown. The fluid emanating from the pump 82 into the central passage of the electrode 78 and from the pump 84 into the chamber 62 would be moving out of the plane of the FIGURE 3.

The FIGURE 4 is a sectional view taken along the line 4—4 which bisects the cavity 44. The "cage" of bolts 66 is clearly visible as well as the nuts 70 which secure the electrode reflector 40 to the support member 50. In addition, the split die 10 having its die sections 10a and 10b surrounds the tubular member 24, the die sections 10a and 10b being advanced by the chain members 12 and 18, respectively. The electrode 78 with its aperture 80 will discharge fluid into the cavity 44 and upon the occurrence of an electrical discharge between the electrodes 78 and 86, the tubular member 24 will be propelled circumferentially outward against the split die 10. This procedure results in a force being created against the tubular member 24 so as to result in a severing and flanging operation since the split die 10 is so adapted to yield this operation.

Figure 5:
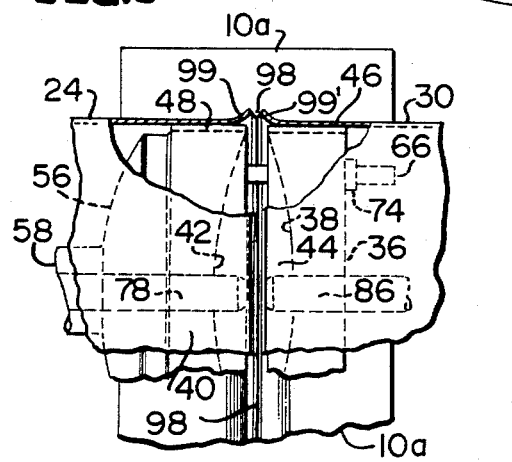
FIGURE 5 is an elevational view, partly in section, and showing the position of a tubular member after a discharge within the cavity so that the tubular member has become severed and flanged.

The FIGURE 5 is an elevational view, partly in section, which is similar to the FIGURE 2 except that the position of the tubular member 24 is shown after an electrical discharge between the electrodes 78 and 86. Since the split die 10 is a severing and flanging die, this particular operation will result upon the actuation of the power supply 96 of the FIGURE 2. In the FIGURE 5, it will be noted that the tubular member 24 has been driven into the severing knife 98 formed about the inner circumference of the split die 10 which resulted in a severing of a container body 30 from the tubular member 24. In addition, it will be noted that a small recess on either side of the severing blade 98 is provided which receives the newly formed edge of the tubular member 24 and the container body 30 so as to flange the newly severed edge as indicated at 99 and 99'. Thus, the container body 30 is severed and flanged in one operation and the newly flanged edge is ready for receiving a container end (not shown).

Figure 7:
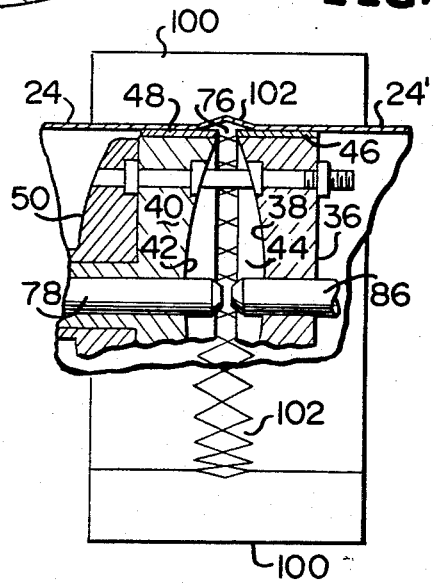
FIGURE 7 is an elevational view, partly in section, illustrating the practice of the invention with an embossing die.

In addition to the operations of severing and flanging, many other operations may be performed by the invention. The operation to be performed is usually dictated by the configuration of the die surrounding the advancing tubular member. For example, embossing is oftentimes performed on container bodies and the configuration of the embossing whether it be a bead, criss-cross, dimpled, etc. would be formed about the inner circumference of the die and as the tubular member is forced against the die by the electrohydraulic discharge of the invention, the tubular member would assume the form of the inner surface of the die. As shown in the FIGURE 7, a diamond-shaped embossing is accomplished by a die 100 having the required pattern as indicated at 102. As the tubular member 24 is forced outwardly upon the occurrence of a spark discharge, it will be pressed into the embossing die 100 so that the surface of the tubular member 24 assumes that of the diamond-shaped pattern 102 of the embossing die 100. After embossing, the tubular member 24 is identified as 24'.

Figure 6:
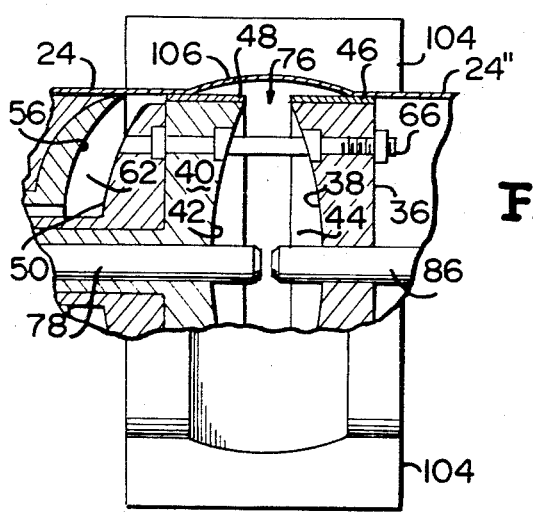
FIGURE 6 is an elevational view, partly in section, illustrating a reforming die and wherein the peripheral exposure of the cavity has been increased over that of earlier figures.

Other and varied operations of the device are anticipated and a reforming procedure is set forth in the FIGURE 6. More specifically, a reforming die 104 has formed about its inner surface an arcuate depression 106. The peripheral exposure 76 of the FIGURE 2 has been increased in the FIGURE 6 so as to more readily accommodate the reforming operation. Although certain reforming operations may be accomplished by a single discharge between the electrodes 78 and 86, other reforming steps may be more readily accomplished by a series of successive discharges to more accurately force the inner surface of the tubular member 24 into the depression or groove 106 of the die 104. However, experimentation and practice with the invention will dictate the distance of the peripheral exposure 76' and the number of discharges necessary to accurately reform the tubular member 24 into the desired configuration as dictated by the reforming die. In the FIGURE 6, after reforming (perhaps may also be termed as forming a bead about the tubular member 24) the tubular member 24 is identified as 24".

It will be readily evident to those skilled in the art that many other and varied operations and configurations may be formed on the advancing tubular member and that the horn structure for producing the force to yield the operation may be advanceable with the tubular member and die so that it is not necessary to halt the operation during electrohydraulic discharges. That is to say, the horn structure could reciprocate and during its forward motion be aligned with a selected point on the tubular member and the die and after actuation of the power supply, quickly return to there again advance with the tubular member and die.

There has been described and illustrated a horn structure for providing a force to sever, flange, emboss, reform, etc. a tubular member passing thereover. The horn structure is comprised of a pair of electrode reflectors having opposing concave surfaces which form a chamber therebetween. The electrode reflectors are separated so as to present a peripheral exposure. An electrode is projected through each of the electrode reflectors and into the cavity or chamber therebetween. The application of a suitable source of electrical energy to the electrodes will cause a spark discharge between the electrodes. The force which performs the mechanical work on the tubular member is created by the discharging of a high power spark across the spark gap within the cavity formed by the electrode reflectors. A plasma bubble is formed in the spark gap and the plasma bubble continues to grow as continued power flows from the power supply into the spark gap. Fluid is supplied to the cavity and the displacement of the fluid by the bubble forces the fluid outwardly very rapidly against the work piece, the work piece then being forced into a surrounding die. Since the operation is extremely rapid, it is not necessary to halt the forward motion of the tubular member or work piece during forming operations. The configuration of the cavity may take many and varied forms according to the acoustical coupling achieved between the spark discharge and the cavity. Experimentation will dictate the most proficient type of cavity for the operation to be performed.

In addition to the supplying of fluid to the spark discharge cavity, fluid is supplied around the horn structure so that the tublar member "floats" over the horn structure and thereby minimizes friction and wear of the apparatus. Means are employed for advancing the electrodes since continued and repeated discharges may eventually erode the electrodes and thereby increase the spark gap if the erosion is not compensated for. This fluid supply method provides a lowpass acoustical filter to allow steady state flow while preventing transmission of impulsive hydraulic energy. The fluid also removes contaminates, provides cooling, etc.

Thus, the present invention may be embodied in other specific forms without departing from the spirit and the essential characteristics of the invention. The present embodiment is, therefore, to be considered in all respects as illustrative and the scope of the invention being indicated by the appended claims rather than the foregoing description, and all changes which come within the meaning and range of the equivalency of the claims are, therefore, intended to be embraced therein.

What is claimed is:

1. Electrohydraulic means comprising a first electrode reflector having a concave surface, a second electrode reflector having a concave surface, said concave surfaces being in opposing relationship as to form a cavity therebetween, a first electrode projecting through said first electrode reflector and into said cavity, and a second electrode projecting through said second electrode reflector and into said cavity, said electrode reflectors being spaced apart and defining narrow opening means at the peripheries thereof for directing forces outwardly therethrough.

2. Electrohydraulic means as defined in claim 1 wherein said first and said second electrodes are longitudinally aligned, their adjacent terminals being in spatial relationship.

3. Electrohydraulic means as defined in claim 1 wherein said first electrode reflector and said second reflector are closely spaced along the entire peripheries thereof, said narrow opening means being continuous about said peripheries for directing forces radially outwardly in all directions away from said first and second electrodes.

4. Electrohydraulic means as defined in claim 3 including means cooperating with said first electrode reflector and said second electrode reflector for varying the width of said narrow opening means.

5. Electrohydraulic means as defined in claim 2 including means for varying the separation of said first and said second electrodes in spatial relationship.

6. Electrohydraulic means as defined in claim 1 including means for supplying fluid to said cavity.

7. Electrohydraulic means as defined in claim 1 including means for maintaining the position of said first electrode reflector constant with respect to said second electrode reflector and means for adjusting said second electrode to maintain spatial relationship with said first electrode.

8. Electrohydraulic means as defined in claim 3 including electrical supply means for causing a discharge between said electrodes, the energy generated thereby being directed through said narrow opening means.

9. Apparatus for forming a tubular member comprising a horn structure, means for advancing a tubular member about said horn structure, a plurality of dies surrounding said horn structure, each of said dies being spaced from said horn structure to permit the passage of a tubular member therebetween, said horn structure including a first electrode reflector having a concave surface, a second electrode reflector having a concave surface, said concave surfaces being in opposing relationship to form a cavity therebetween, a first electrode projecting through said first electrode reflector and into said cavity, and a second electrode projecting through said second electrode reflector and into said cavity.

10. Apparatus as defined in claim 9 including means for advancing said dies along with a tubular member.

11. Apparatus as defined in claim 9 wherein said first and said second electrodes are longitudinally aligned, their adjustment terminals being in spatial relationshp.

12. Apparatus as defined in claim 9 wherein said first electrode reflector and said second electrode reflector are so positioned as to form said cavity with the peripheral exposure for transmitting energy therethrough and directed toward a tubular member in a plane perpendicular to the longitudinal axis of said horn structure.

13. Apparatus as defined in claim 9 including means cooperating with said first electrode reflector and said second electrode reflector for varying the width of said peripheral exposure.

14. Apparatus as defined in claim 13 wherein said means for varying the width of said peripheral exposure includes a plurality of axially spaced bolts having movable locking means positioned thereon to thereby vary the separation of said electrode reflectors and the width of said peripheral exposure.

15. Apparatus as defined in claim 9 including means for varying the separation of said first and said second electrodes in spatial relationship.

16. Apparatus as defined in claim 9 including means for supplying fluid to said cavity.

17. Apparatus as defined in claim 12 including electrical supply means for causing a discharge between said electrodes, the energy generated thereby being directed through said peripheral exposure.

18. Apparatus as defined in claim 9 including an outer jacket positioned upstream from said first electrode reflector and forming a cavity therebetween having a peripheral opening.

19. Apparatus as defined in claim 18 including means for supplying a fluid to said cavity between said outer jacket and said first electrode reflector for discharge along a tubular member and the peripheries of said first and second electrode reflectors.

20. Apparatus as defined in claim 9 wherein each of said dies is a severing and flanging die.

21. Apparatus as defined in claim 9 wherein each of said dies is an embossing die.

22. Apparatus as defined in claim 9 wherein each of said dies is a reshaping die.

23. Apparatus for forming a tubular member comprising a horn structure, means for advancing a tubular member about said horn structure, a plurality of dies arranged in spaced end to end relationship, said dies surrounding said horn structure and spaced therefrom to permit the passage of said tubular member therebetween, said horn structure including a first electrode reflector having a concave surface, a second electrode reflector having a concave surface, said concave surfaces being in opposing relationship as to form a cavity therebetween, a first electrode projecting through said first electrode reflector and into said cavity, a second electrode projecting through said second electrode reflector and into said cavity, said first and said second electrodes being longitudinally aligned, their adjacent terminals being in spatial relationship, said first electrode reflector and said second electrode reflector being so positioned as to form said cavity with a peripheral exposure for transmitting energy therethrough and directed toward said tubular member in a plane perpendicular to the longitudinal axis of said horn structure, means cooperating with said first electrode reflector and said second electrode reflector for varying the width of said peripheral exposure, means for varying the separation of said first and said second electrodes in spatial relationship, means for supplying fluid to said cavity, electrical supply means for causing a discharge between said electrodes, the energy generated thereby being directed through said peripheral exposure, said horn structure further including an outer jacket positioned upstream from said first electrode reflector and forming a cavity therebetween having a peripheral opening, means for supplying a fluid to said cavity between said outer jacket and said first electrode reflector for discharge along a tubular member and the peripheries of said first and second electrode reflectors, means for moving said dies at a velocity commensurate with said tubular member during its forward motion.

24. Apparatus as defined in claim 23 wherein each of said dies is a split die and including means to sever and flange said tubular member when directed against said die, and means for advancing said split die along a first path wherein said die surrounds said tubular member and along a second path wherein said die is split and separated.

25. Apparatus as defined in claim 23 wherein each of said dies is a split die and including means to emboss said tubular member when directed against said die, and means for advancng said split die along a first path wherein said die surrounds said tubular member and along a second path wherein said die is split and separated.

26. Apparatus as defined in claim 23 wherein each of said dies is a split die and including means to reform said tubular member when directed against said die, and means for advancing said split die along a first path wherein said die surrounds said tubular member and along a second path wherein said die is split and separated.

References Cited

UNITED STATES PATENTS

| | | | |
|---|---|---|---|
| 3,044,430 | 7/1962 | Zeigler | 72—56 |
| 3,160,723 | 12/1964 | Wallace | 72—56 X |
| 3,232,085 | 2/1966 | Inoue | 72—56 |
| 3,267,780 | 8/1966 | Roth | 72—56 |
| 3,310,972 | 3/1967 | Erlandson et al. | 72—63 |

RICHARD J. HERBST, *Primary Examiner.*